United States Patent [19]
Saito et al.

[11] 3,876,710
[45] Apr. 8, 1975

[54] PROCESS FOR PRODUCING P-TERT-BUTYLPHENOL

[75] Inventors: Takayuki Saito; Takeshi Tanno; Yasuyuki Iguchi; Shigeru Shoji; Takeo Awano, all of Hitachi, Japan

[73] Assignee: Hitachi Chemical Company, Ltd., Tokyo, Japan

[22] Filed: Nov. 12, 1971

[21] Appl. No.: 198,448

[30] Foreign Application Priority Data
Dec. 25, 1970  Japan.............................. 45-117770

[52] U.S. Cl............................................ 260/624 C
[51] Int. Cl............................................. C07c 39/06
[58] Field of Search............. 260/624 C, 624 R, 624

[56] References Cited
UNITED STATES PATENTS

| | | | |
|---|---|---|---|
| 2,091,565 | 8/1937 | Perkins........................... | 260/624 R |
| 2,419,599 | 4/1947 | Schulze........................... | 260/624 C |
| 2,578,597 | 12/1951 | Robinson........................ | 260/624 R |
| 2,623,911 | 12/1952 | Carson et al.................... | 260/624 R |

Primary Examiner—Bernard Helfin
Assistant Examiner—W. B. Lone
Attorney, Agent, or Firm—Craig & Antonelli

[57] ABSTRACT p-tert-butylphenol is prepared by contacting phenol with isobutylene oligomer in a liquid state under pressure at a temperature of 160° – 250°C in the presence of a catalyst of silica-alumina system containing 60 – 90 % by weight of silica and 10 – 40 % by weight of alumina as main components. p-tert-butylphenol is useful as a raw material for producing alkylphenolic resins which are used as paints, adhesives and rubber tackifiers.

15 Claims, No Drawings

PROCESS FOR PRODUCING P-TERT-BUTYLPHENOL

This invention relates to a novel process for producing p-tert-butylphenol, which will be hereinafter referred to as "4-TBP", by reacting phenol with an isobutylene oligomer or a mixture thereof in the presence of a catalyst of silica-alumina system, and more particularly to a process for obtaining 4-TBP in one step in high yield by contacting phenol with an isobutylene oligomer or a mixture thereof in a liquid state under pressure at a high temperature in the presence of solid catalyst of silica-alumina system and if necessary in the presence of a solvent.

4-TBP is a very useful compound as a starting material for producing alkylphenoic resins used as points, adhesives and synthetic rubber tackifiers.

Heretofore, there has been proposed a process for producing 4-TBP which comprises reacting isobutylene with phenol in the presence of sulfuric acid or aluminum chloride as a catalyst thereby to alkylate phenol and isomerizing the resulting product mixture in another isomerization step at a high temperature. According to the prior art process, the product mixture obtained in the alkylation step contains a large amount of byproducts other than the desired 4-TBP, and therefore, it is necessary to convert these by-products to the desired 4-TBP by isomerization at a high temperature. Consequently, the process inevitably requires two steps for the reaction. That is, since the isomerization is necessary in the prior art process, the steps themselves are complicated and industrially very disadvantageous.

Further, there have been proposed a process based on reaction of phenol with an isobutylene oligomer in the presence of Bronsted acid such as sulfuric acid, hydrofluoric acid, etc., a process based on the reaction in the presence of aluminum chloride as a catalyst, a process based on the reaction using ion exchange resins, etc.

However, these prior art processes have the following disadvantages and have not been used as an industrial scale process. That is to say, in the process where such Bronsted acid as sulfuric acid, hrdrofluoric acid, etc. is used as a catalyst, corrosion is serious at a high temperature and it is difficult to carry out the reaction at a temperature higher than 120°C. When the reaction temperature is lowered, more by-products are produced and the yield of the desired 4-TBP is lowered. Furthermore, in said prior art process, a large amount of the catalyst must be used, and it is necessary to provide additional steps such as neutralization and water washing steps for the catalyst to control the corrosion of the reaction apparatus due to the catalyst. Furthermore, there is a fear of environmental pollution by waste water containing phenol, etc. The prior art process has these disadvantages.

In the prior art process where aluminum chloride is used as a catalyst, the 4-TBP yield is somewhat improved, as compared with the process using the Bronsted acid, but it is necessary to control the corrosion of the reaction apparatus. That is, the neutralization and water washing steps are required and there is a fear of environmental polution due to the waste water. The prior art process based on the aluminum chloride catalyst has also many disadvantages.

In the prior art process where ion exchange resins are used, there is neither corrosion of the reaction apparatus nor provision of the neutralization and water washing step nor the fear of the resulting environmental pollution due to the waste water, but the reaction must be carried out at a reaction temperature of 100° – 110°C or less, and therefore, the yield of the desired 4-TBP is disadvantageously lowered, because the physical strength of the ion exchange resins is lowered at a high temperature above 120°C and the ion exchange resins fail to withstand a prolonged service.

Furthermore, U.S. Pat. No. 2,578,597 discloses a process for producing alkylphenols having an alkyl group of same number of carbon atoms as that of carbon atoms of olefin used as a starting material, by reacting phenol with the olefin in the presence of a silica-alumina catalyst containing 0.1 – 10 % by weight of alumina and in the presence of a solvent. However, in the prior art process much heat is released at the reaction and it is very difficult to control the reaction temperature. When the reaction is carried out at a lower temperature, the yield of the desired 4-TBP is lowered. On the contrary when the reaction is carried out at a higher temperature, undesirable side reactions appear, and it is complicated to separate the desired 4-TBP from the product mixture. These are disadvantages of the prior art process.

An object of the present invention is to eliminate the disadvantages of the prior art processes and to provide a one-step process for producing 4-TBP in high yield.

Other object of the present invention is to provide a process based on the use of a specific catalyst without any fear of corrosion of reaction apparatus.

Another object of the present invention is to provide a process for producing 4-TBP in high yield in a much simplified apparatus without any of additional neutralization and water-washing steps, that is, without any fear of environmental pollution such as water pollution due to the waster water.

Further object of the present invention is to provide a process where the reaction temperature can be very readily controlled.

Still further object of the present invention is to provide a process for producing the desired 4-TBP in high yield at a higher reaction temperature.

According to the present invention, 4-TBP is produced in high yield in one step without any additional isomerization step by contacting phenol with an isobutylene oligomer or a mixture thereof in a liquid state under pressure at a temperature of 160° – 250°C in the presence of a catalyst of silica-alumina system containing 60 – 90 % by weight of $SiO_2$ and 10 – 40 % by weight of $Al_2O_3$ as main components and if necessary in the presence of a solvent.

The isobutylene oligomer used in the present invention is at least one member selected from the group consisting of dimers to pentamers of isobutylene.

By keeping the reactants, phenol and isobutylene oligomer, in a liquid state, chances for contact of the reactants with the catalyst are increased. By carrying out the reaction at a temperature of 160° – 250°C., the reaction rate increases. Furthermore, since the reaction system can be kept uniform, and the reaction apparatus can be readily controlled, the reaction apparatus can be more advantageously simplified than that used in the gaseous phase reaction.

To keep the reactants in a liquid state at the reaction temperature, the reactants are liquefied under pressure as such, or liquefied under pressure in the presence of a solvent. Any solvent can be used, so long as the solvent is in a liquid state under pressure at the reaction temperature and is capable of dissolving the reactants and chemically inert to the reactants and the catalyst. For example, such linear and cyclic aliphatic saturated hydrocarbons as pentane, hexane, cyclopentane, cyclohexane, etc. may be used as the solvent.

Any pressure is applicable to the reaction system, so long as the reactants and the solvent can be kept in a liquid state at the reaction temperature under the application of the pressure.

As the catalyst, it is necessary to use a catalyst of silica-alumina system containing 10 – 40 % by weight of alumina and 60 – 90 % by weight of silica. Further an oxide of metal of the group II, III or IVb of the periodic table can be contained in the catalyst. The catalyst containing 10 – 40 % by weight, preferably 15 – 30 % by weight of alumina, and 60 – 90 % by weight, preferably 70 – 85 % by weight of silica has not only higher catalytic activity and physical strength, but also longer catalyst life. The catalyst containing alumina and silica beyond said range is not preferable, because the catalytic activity is lowered. As the catalyst of silica-alumina system having said silica and alumina contents, the catalyst calcined at a temperature of 600° to 800°C for 2 to 5 hours is particularly preferable.

The reaction temperature is 160° to 250°C. When the reaction temperature is lower than 160° C, the by-products other than 4-TBP are much produced, and when the reaction temperature exceeds 250°C, the product undergoes decomposition and dealkylation. In any case, the yield of 4-TBP is lowered, when a reaction temperature is outside the range of 160° to 250°C.

Ratio of isobutylene oligomer to phenol to be fed is given as follows. In the case of diisobutylene and phenol, it is preferable to feed 2 to 10 moles of phenol per mole of diisobutylene. In the case of triisobutylene and phenol, it is preferable to feed 3 to 15 moles of phenol per mole of triisobutylene. Further, when a mixture of diisobutylene and triisobutylenen or other isobutylenes singly or in mixture is used, it is preferable to feed 1 to 5 moles of phenol per mole of isobutylene oligomer composition in terms of isobutylene. A very excessive amount of phenol is not preferable, because the capacity of the reaction apparatus increases and utility costs increase. A very excessive amount of isobutylene is not preferable, either, because polymers are much more easily formed and the catalyst life is lowered.

The present process has the following advantages, as compared with the conventional processes for producing 4-TBP in an industrial scale.

1. Isobutylene oligomer and phenol, both being liquefied under pressure, are used as raw materials.
2. Since the reaction temperature can be elevated, the desired 4-TBP can be obtained in one step in high yield without using any isomerization step.
3. Since a catalyst of silica-alumina system having a specific composition is used and the reaction is carried out by solid-liquid contact, no neutralization and water washing steps are required and the apparatus is simplified. At the same time there is no fear of environmental pollution due to the waste water.
4. There is no fear of corrosion of the reaction apparatus.
5. Since the isobutylene oligomer is used, the heat of reaction is small, and the reaction temperature can be readily controlled without using any solvent.

Now, the present invention will be explained in detail, referring to examples.

EXAMPLE 1

0.9 kg of a silica-alumina catalyst containing 74 % by weight of $SiO_2$ and 26 % by weight of $Al_2O_3$ calcined at 600°C for 2 hours was packed in a one-pass type reactor and a liquid mixture containing 0.25 parts by mole of diisobutylene consisting of a major portion of 2,4,4-trimethyl-1-pentene and a minor portion of 2,4,4-trimethyl-2-pentene and one part by mole of phenol was passed through the reactor at a liquid flow rate of 3 l/hr. LHSV (liquid hourly space velocity) = 2 $hr^{-1}$ at a reaction temperature of 200°C under a pressure of 20 $kg/cm^2$ thereby to carry out the reaction. The conversion of diisobutylene was 81 % by one pass and the composition of the reaction product mixture is given in Table 1. It is seen from the composition of the alkylphenols shown in Table 1 that selectivity toward 4-TBP is very high. When the reaction was carried out continuously under the same conditions as above for 200 hours, the selectivity toward 4-TBP was not reduced almost at all and the conversion of diisobutylene was only reduced by less than 10 %.

Table 1

| Composition of alkylated phenols | % by mole |
|---|---|
| 2-tert-butylphenol | 6.3 |
| 4-TBP | 84.8 |
| 2,4-di-tert-butylphenol | 4.4 |
| 4-octylphenol | 4.5 |

EXAMPLE 2

A silica-alumina catalyst containing 16 % by weight of $Al_2O_3$ and 84 % by weight of $SiO_2$ calcined at a temperature of 600°C for 5 hours was packed in a one-pass type reactor, and a liquid mixture containing 0.346 parts by mole of diisobutylene and one part by mole of phenol was passed through the reactor at LHSV (liquid hourly space velocity) of 1.28 $hr^{-1}$ at a reaction temperature of 210°C under a pressure of 32 $kg/cm^2$ thereby to carry out reaction. As a result, an alkylphenol mixture having the composition as shown in Table 2 was obtained. The conversion of diisobutylene was 75.8 %.

Table 2

| Composition of alkylated phenols | % by mole |
|---|---|
| 2-tert-butylphenol | 4.65 |
| 4-TBP | 88.28 |
| 2,4-di-tert-butylphenol | 4.99 |
| 4-tert-octylphenol | 2.08 |

EXAMPLE 3

47.0 g of phenol and 20.0 g of a silica-alumina catalyst containing 74 % by weight of $SiO_2$ and 26 % by weight of $Al_2O_3$ calcined at 700°C and molded in columnar forms of 5 mm in diameter and 5 mm in height were charged in an electromagnetic type autoclave having a capacity of 200 cc and the pressure of the autoclave was increased to 4 $kg/cm^2$ gage with nitrogen. Inside temperature of the autoclave was kept at 180°C. Then, 21.0 g (0.125 moles) of triisobutylene consisting mainly of 2,2,6,6-tetramethyl-4-methyleneheptane and 2,2,4,6,6-pentamethyl-3-heptene was charged into the autoclave by a pressure injection pump and subjected to reaction for 1 hour. Gas chromatographic analysis of the reaction product revealed that 36.0 g of 4-TBP was obtained and the conversions of phenol and triisobutylene were 85 %  and 65 %, respectively.

EXAMPLE 4

A silica-alumina catalyst containing 16 % by weight of alumina calcined at 700°C for 5 hours was packed in a one-pass type reactor and a liquid mixture containing one part by weight of a diisobutylene-triisobutylene mixture consisting of 40 % by mole of diisobutylene and 60 % by mole of triisobutylene, and 3.0 parts by weight of phenol was passed through the reactor at a liquid flow rate of 3 l/hr. and LHSV (liquid hourly space velocity) of 2 hr$^{-1}$ at a reaction temperature of 200°C under a pressure of 20 kg/cm$^2$. The result is as shown in Table 4. The conversion of diisobutylene-triisobutylene was 83 % by one pass and the selectivity toward 4-TBP is high as shown in Table 4.

Table 4

| Composition of alkylated phenols | % by mole |
| --- | --- |
| 2-tert-butylphenol | 5.4 |
| 4-TBP | 85.6 |
| 2,4-di-tert-butylphenol | 4.5 |
| 4-octylphenol | 4.5 |

What is claimed is:

1. A process for producing p-tert-butylphenol from phenol and isobutylene oligomers, which comprises contacting phenol with at least one isobutylene oligomer selected from the group consisting of dimers to pentamers of isobutylene in a liquid state under pressure, at a temperature of 160° to 250°C in the presence of a silica-alumina catalyst containing 60 to 90 % by weight of SiO$_2$ and 10 to 40 % by weight of Al$_2$O$_3$.

2. A process according to claim 1, wherein the catalyst is calcined at a temperature of from 600°C to 800°C.

3. A process according to claim 1, wherein 1 to 5 parts by mole of phenol is used per mole of the isobutylene oligomer singly or in admixture in terms of isobutylene.

4. A process according to claim 1, wherein the catalyst contains 70 to 85 % by weight of SiO$_2$ and 15 to 30 % by weight of Al$_2$O$_3$.

5. A process for producing p-tert-butylphenol from phenol and isobutylene oligomers, which consist essentially of contacting phenol with at least one isobutylene oligomer selected from the group consisting of dimers to pentamers of isobutylene, wherein 1 to 5 parts by mole of phenol is used per mole of the isobutylene oligomer or mixture thereof in terms of isobutylene, in a liquid state under pressure at a temperature of 160° to 250°C in contact with a silica-alumina catalyst containing 70 to 85 % by weight of SiO$_2$ and 15 to 30 % by weight of Al$_2$O$_3$.

6. A process according to claim 5, wherein the silica-alumina catalyst is calcined at a temperature of from 600°C to 800°C for 2 to 5 hours.

7. A process according to claim 5, wherein the isobutylene oligomer is diisobutylene and the phenol is present in 2 to 10 moles per mole of said diisobutylene.

8. A process according to claim 5, wherein the isobutylene oligomer is triisobutylene and the amount of phenol present per mole of triisobutylene is from 3 to 15 moles.

9. A process according to claim 5, wherein a solvent is present, said solvent being in a liquid state under the reaction pressures and temperatures and being capable of dissolving the reactants and chemically inert to the reactants and the catalysts.

10. A process according to claim 5, wherein the catalyst further contains an oxide of a metal of the group II, III or IVb of the Periodic Table.

11. A process according to claim 5, which is carried out continuously for 200 hours.

12. A process according to claim 5, wherein the silica-alumina catalyst contains 74% by weight of SiO$_2$ and 26% by weight of Al$_2$O$_3$, wherein said catalyst is calcined at 600°C for 2 hours, and wherein the oligomer is diisobutylene consisting of a major portion of 2,4,4-trimethyl-1-pentene and a minor portion of 2,4,4-trimethyl-2-pentene.

13. A process according to claim 1, wherein said catalyst is calcined at a temperature of from about 600°C to 800°C for 2 to 5 hours and consists essentially of 60 to 85 % by weight SiO$_2$, 15 to 30 % by weight Al$_2$O$_3$ and an oxide of a metal of Groups II, III or IV of the Periodic Table.

14. A process according to claim 9, wherein the solvent is selected from linear and cyclic aliphatic saturated hydrocarbons.

15. A process according to claim 14, wherein the solvent is selected from the group consisting of pentane, hexane, cyclopentane and cyclohexane.

* * * * *